United States Patent Office 3,362,731
Patented Jan. 9, 1968

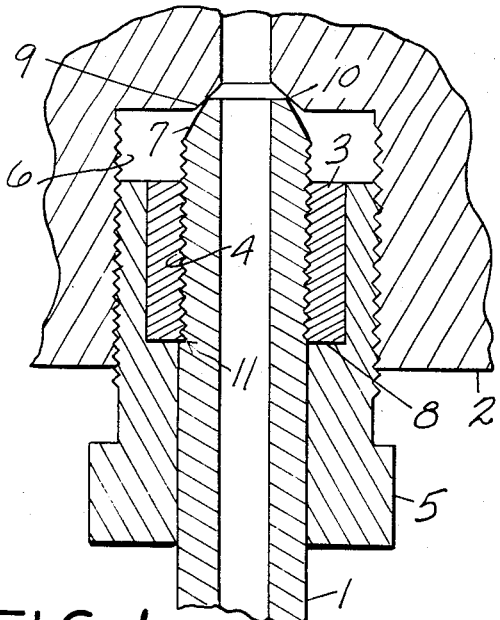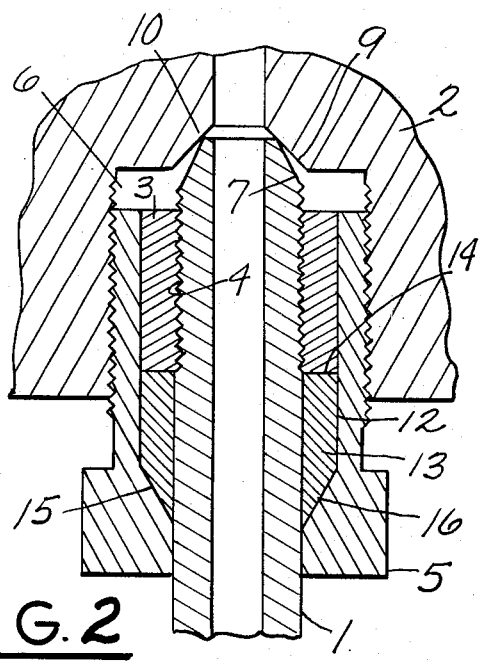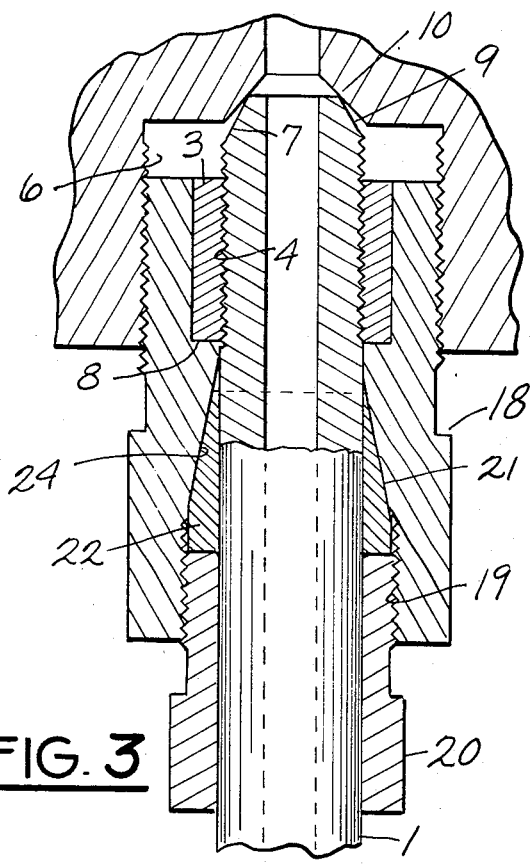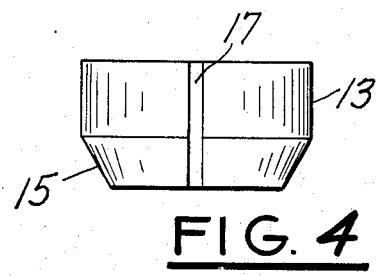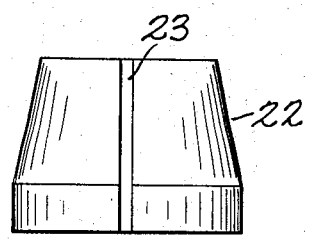

3,362,731
HIGH PRESSURE FITTING
Fred Gasche, Erie, and Ira H. Schnall, Fairview, Pa., assignors to Autoclave Engineers, Inc., Erie, Pa., a corporation of Pennsylvania
Filed Nov. 22, 1965, Ser. No. 508,904
5 Claims. (Cl. 285—212)

ABSTRACT OF THE DISCLOSURE

Fatigue failure of a high pressure fitting of the type having a gland nut cooperating with a thrust collar to force one end of a tube against a seat is prevented by a collet in the gland nut which is contracted radially by complementary wedging surfaces on the collet and nut to grip the tubing and hold it in fixed relation to the gland nut. This prevents fatigue failure which has heretofore occurred in the tubing adjacent the thrust collar.

---

The commonly used fitting for high pressure tubing has a tapered end on the tubing which is forced against a seat by a gland nut cooperating with a thrust collar screwed on the tubing. Under vibration, fatigue failure occurs in the tubing adjacent the thrust collar. This failure is eliminated by a collet in the gland nut in back of the thrust collar which is contracted radially into gripping engagement with the tubing by cooperating wedge surfaces on the collet and gland nut.

In the drawing, FIG. 1 is a sectional view through a prior art high pressure fitting, FIG. 2 is a section through an improved high pressure fitting, FIG. 3 is a section through a modification, FIG. 4 is an elevation of the collet used in the FIG. 2 fitting and FIG. 5 is an elevation of the collet used in the FIG. 3 fitting.

The prior art fitting used for making connections between high pressure tubing 1 and devices such as valve bodies 2 comprises a collar 3 screwed onto the threaded end 4 of the tubing and a gland nut 5 screwed into a socket 6 in the device 2. The high pressure tubing has a tapered end 7 in front of the collar. As the gland nut 5 is tightened, a shoulder 8 on the nut in back of the collar 3 engages the collar and forces the tapered end 7 axially into engagement with a tapered seat 9 at the bottom of the socket. This results in a line contact seal in the region indicated by the numeral 10. This fitting is widely used in high pressure tubing. Under vibration conditions, the tubing fails in the region indicated by the numeral 11.

FIG. 2 is a sectional view of a preferred form of fitting which completely eliminates the failure under vibration conditions. This fitting uses the same collar 3 screwed onto the threaded end 4 of the high pressure tubing 1 and the same gland nut screwed into the threaded socket 6 in the device 2. The seal is made between the tapered end 7 of the tubing and the tapered seat 9 at the bottom of the socket and is a line contact seal in the region indicated by the numeral 10. In order to prevent the fatigue failure of the tubing under vibration conditions, the gland 5 is recessed at 12 to receive the collet 13 shown in section in FIG. 2 and in elevation in FIG. 4. The front end of the collet (the end adjacent the collar 3) has an abrupt shoulder 14 which makes thrust transmitting engagement with the collar 3 in the same manner as the shoulder 8 in the FIG. 1 fitting. The other end of the collet has a taper 15 converging at a wedging angle with respect to the longitudinal axis of the tubing toward the back of the collet which engages a complementary taper 16 in the recess 12. The collet 13 has the usual longitudinal slot 17. As the gland nut is tightened, the shoulder 14 exerts an axial thrust on the collar 3 moving the tapered end 7 of the tubing toward the tapered seat 9 in the device 2. This axial thrust tends to wedge the collet 13 against the tapered seat 16 in the gland nut, forcing the collet into gripping engagement with the high pressure tubing 1. Initially, the collet 13 has a sliding fit on the tubing. After the gland nut 5 is tightened, the wedging contact of the taper 15 on the collet with the complementary taper 16 in the recess 12 contracts the collet radially into gripping engagement with the high pressure tubing. The grip between the collet 13 and the tubing is remote from the threads on the tubing at which the fatigue failure usually takes place under vibration conditions. Under vibration conditions which cause the FIG. 1 fitting to fail after several hundred thousand cycles of vibration, the FIG. 2 fitting under the same conditions will run so many millions of cycles that it apparently has indefinite life.

One advantage of the FIG. 2 fitting is that it uses the standard gland nut 5 modified only by a simple machining operation to receive the collet 13.

In the modification of FIG. 3, a special gland nut is required to make the high pressure sealing connection and another gland nut is required to tighten the collet and thereby grip the high pressure tubing remote from the threads so as to prevent fatigue failure under vibration conditions.

In the FIG. 3 fitting, the gland nut 18 has its front end screwed into the socket 6 and provided with a shoulder 8 engaging the collar 3 screwed onto the threaded end 4 of the high pressure tubing 1 and forcing the tapered end 7 of the tubing into engagement with the tapered seat 9 to effect the seal in the region 10. Both in structure and in sealing action, the front end of the gland nut 18 is the same as the prior art fitting of FIG. 1. With the structure so far described, the FIG. 3 fitting would have the described fatigue failure under vibration conditions.

To overcome the fatigue failure problem, the back end of the gland nut 18 is provided with a tapered recess 21 for a collet 22 converging toward the front of the nut and with a threaded recess 19 for another or auxiliary gland nut 20. As shown in FIG. 5, the collet has the usual longitudinal slot 23. As manufactured, the collet 22 has a sliding fit on the high pressure tubing. After the main gland nut 18 is tightened to effect the seal 7, 9, 10, the other gland nut 20 is screwed into the recess 19, forcing the collet 22 upward as viewed in FIG. 3. The engagement of the tapered surface 24 on the collet with the complementary tapered recess 21 in the fitting causes the collet to be contracted radially into gripping engagement with the tubing, thereby preventing vibration of the tubing relative to the fitting 18 in the region of the threads 4. The FIG. 3 fitting also has indefinite life under vibration conditions. The reason for the improvement is the same as the FIG. 2 fitting, namely, that vibration of the tubing relative to the main gland nut 18 is prevented in the region of the threaded end 4.

What is claimed as new is:

1. In a fitting for tubing having a tapered end for sealing engagement with a seat carried by a female member and having an externally threaded section in back of the taper, a thrust collar screwed on said section, said collar having a smooth cylindrical exterior surface, a gland nut telescoped over the tubing and in embracing contact with said tubing and with said exterior surface of said collar, a radial shoulder in back of the collar, a collet in back of said threaded section and telescoped over the tubing and within the gland nut and in embracing relationship with said tubing, thrust transmitting means having a radial shoulder in engagement with the radial shoulder of said collar for transmitting axial thrust from said nut to said collar, said collet having a longitudinal slot and initially having a sliding fit on the tubing, said collet and nut having interengaging complementary wedge surfaces tapered at a wedging angle with respect to the longitudinal axis of the tubing and said nut having means interengaging with complementary means on said female member to place an axial loading on said collet whereby on application of said axial loading, the collet is radially contracted into gripping engagement with the tubing and the tubing is held in fixed relation to the nut, collar and seat.

2. The fitting of claim 1 in which the radial shoulder engaging the radial shoulder of the collar is on the end of the collet adjacent the threaded section.

3. The fitting of claim 2 in which the wedge surfaces on the collet and nut comprise complementary tapers converging toward the back of the gland nut.

4. The fitting of claim 1 in which the wedge surfaces on the collet and gland nut comprise complementary tapers converging toward the front of the gland nut and said gland nut has means for moving the collet relative to and toward the front of the gland nut.

5. The fitting of claim 1 in which the wedge surfaces on the collet and gland nut comprise complementary tapers converging toward the front of the gland nut and said gland nut has screwed therein another gland nut which when tightened forces the collect relative to and toward the front of the first gland nut.

References Cited

UNITED STATES PATENTS

| | | | |
|---|---|---|---|
| 524,754 | 8/1894 | Chable | 285—212 |
| 2,333,470 | 11/1843 | Cowles | 285—115 |

CARL W. TOMLIN, *Primary Examiner.*

W. L. SHEDD, *Assistant Examiner.*